(12) United States Patent
Xiao

(10) Patent No.: US 8,218,316 B2
(45) Date of Patent: Jul. 10, 2012

(54) PORTABLE ELECTRONIC DEVICE WITH BATTERY COVER

(75) Inventor: Zhi-Qiang Xiao, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 192 days.

(21) Appl. No.: 12/753,122

(22) Filed: Apr. 2, 2010

(65) Prior Publication Data

US 2011/0181162 A1  Jul. 28, 2011

(30) Foreign Application Priority Data

Jan. 23, 2010  (CN) .......................... 2010 1 0300629

(51) Int. Cl.
*G06F 1/16* (2006.01)
(52) U.S. Cl. ................ 361/679.58; 312/233.1; 312/326; 429/97
(58) Field of Classification Search ............. 361/679.58; 312/223.1, 326; 429/97
See application file for complete search history.

(56) References Cited

U.S. PATENT DOCUMENTS

| 7,309,253 | B2 * | 12/2007 | Ge et al. | 439/500 |
| 7,419,742 | B2 * | 9/2008 | Liu et al. | 429/97 |
| 7,495,899 | B2 * | 2/2009 | Liu et al. | 361/679.28 |
| 7,700,223 | B2 * | 4/2010 | Ge et al. | 429/97 |
| 2004/0229114 | A1 * | 11/2004 | Liang et al. | 429/100 |
| 2009/0246609 | A1 * | 10/2009 | Shi et al. | 429/100 |
| 2010/0210324 | A1 * | 8/2010 | Xu | 455/575.1 |
| 2011/0129713 | A1 * | 6/2011 | Liang | 429/97 |

FOREIGN PATENT DOCUMENTS

JP  2011150996 A  *  8/2011

* cited by examiner

*Primary Examiner* — Lisa Lea Edmonds
(74) *Attorney, Agent, or Firm* — Altis Law Group, Inc.

(57) ABSTRACT

A portable electronic device includes a base defining a chamber, a cover, an operating element, a latching element, and a resisting element. The cover is configured for covering the chamber and rotatably attached to the base. The latching element attaches to the cover. The resisting element attaches to one end of the base. The operating element is slidably attached to the base. The resisting element resists the latching element to force the cover to separate when detaching.

20 Claims, 11 Drawing Sheets

Figure 1:
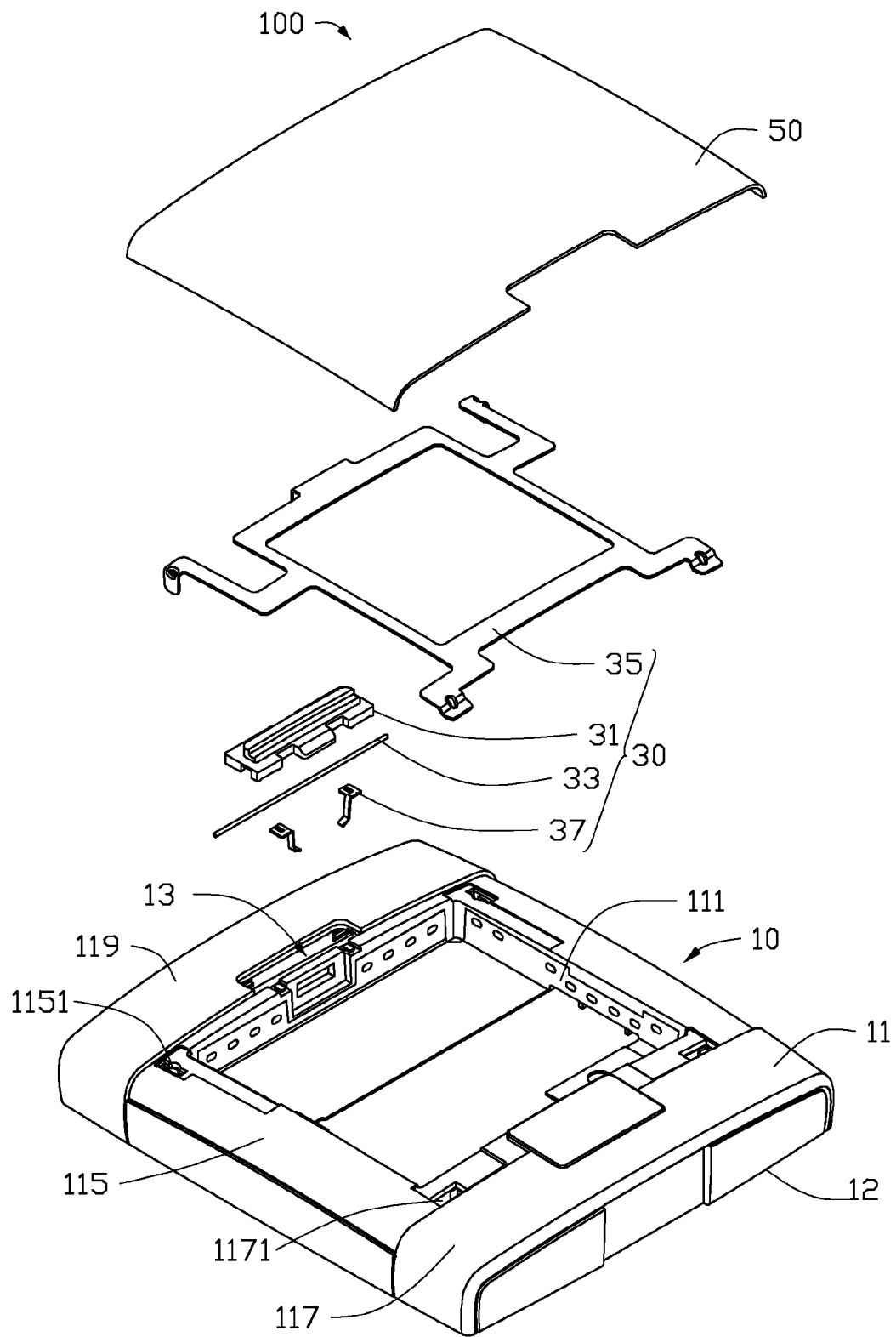
Figure 2:
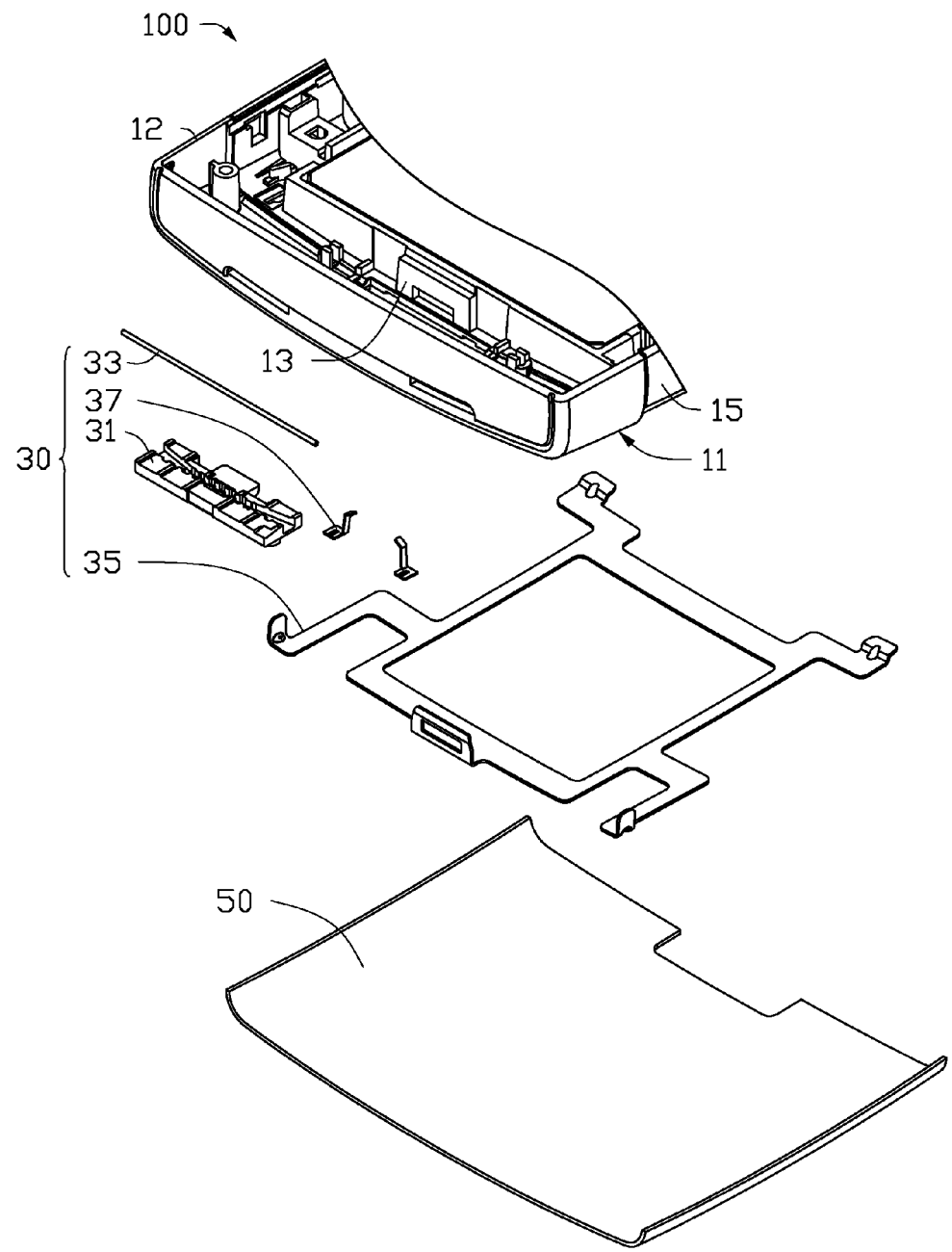
Figure 3:
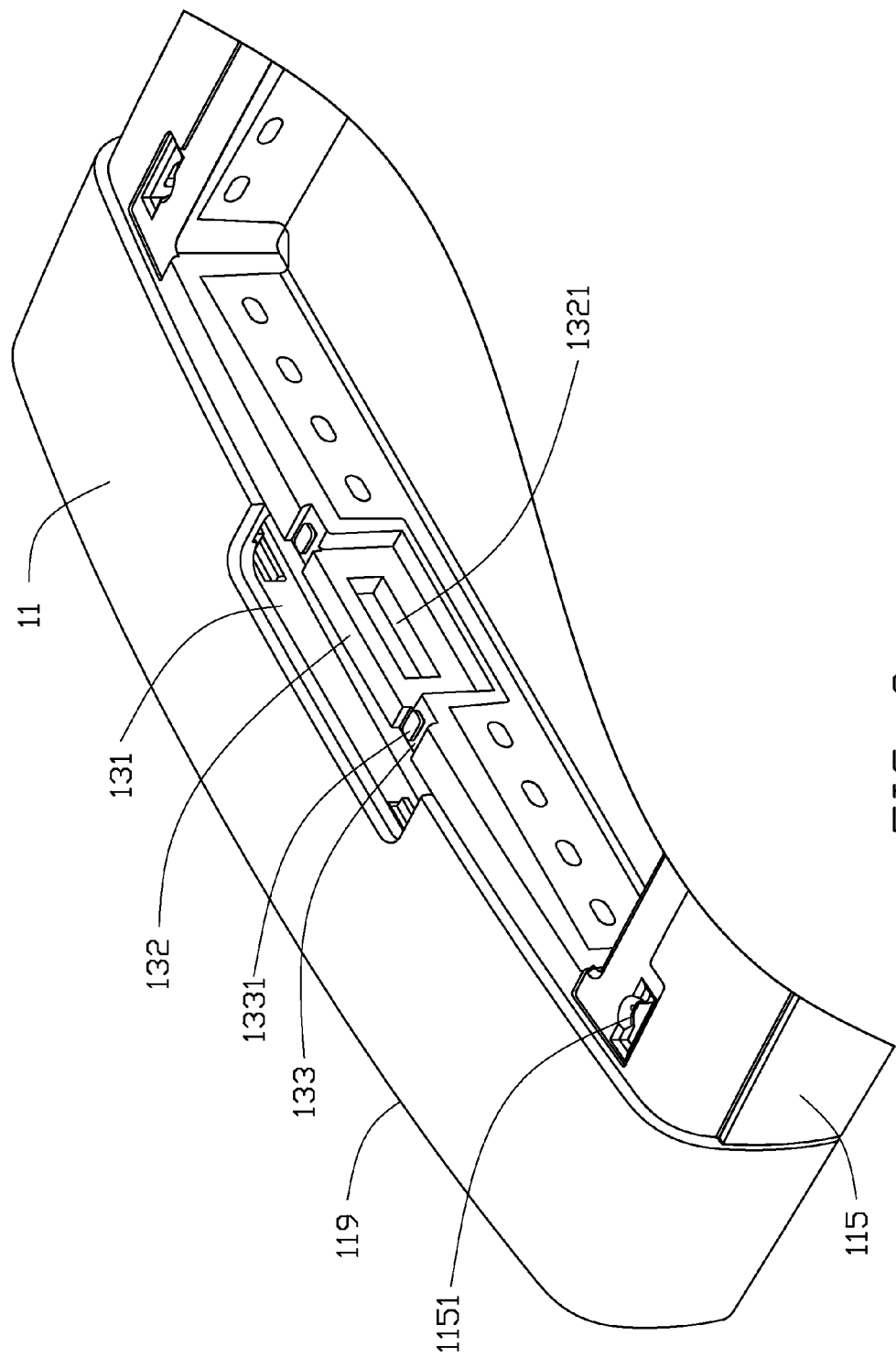
Figure 4:
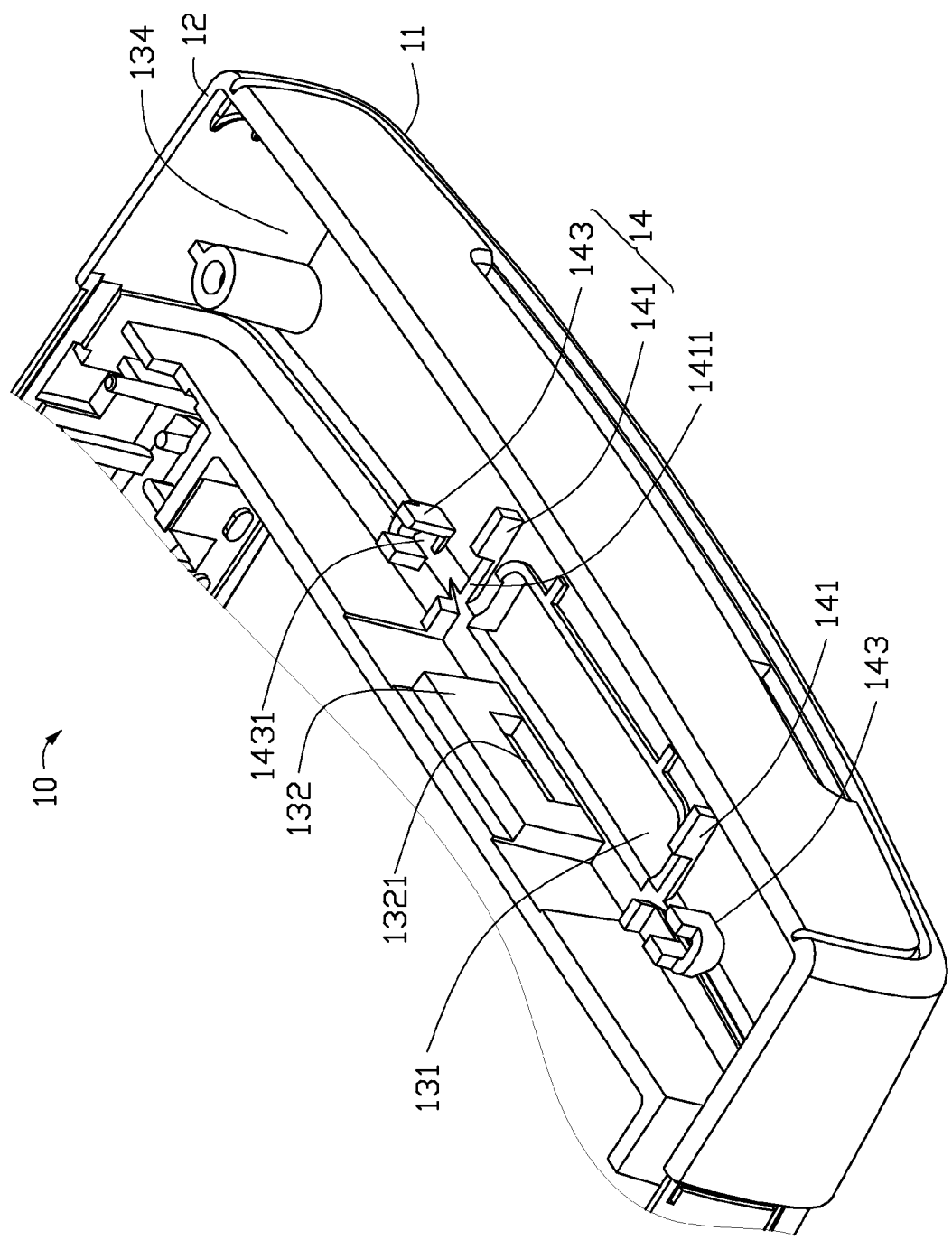
Figure 5:
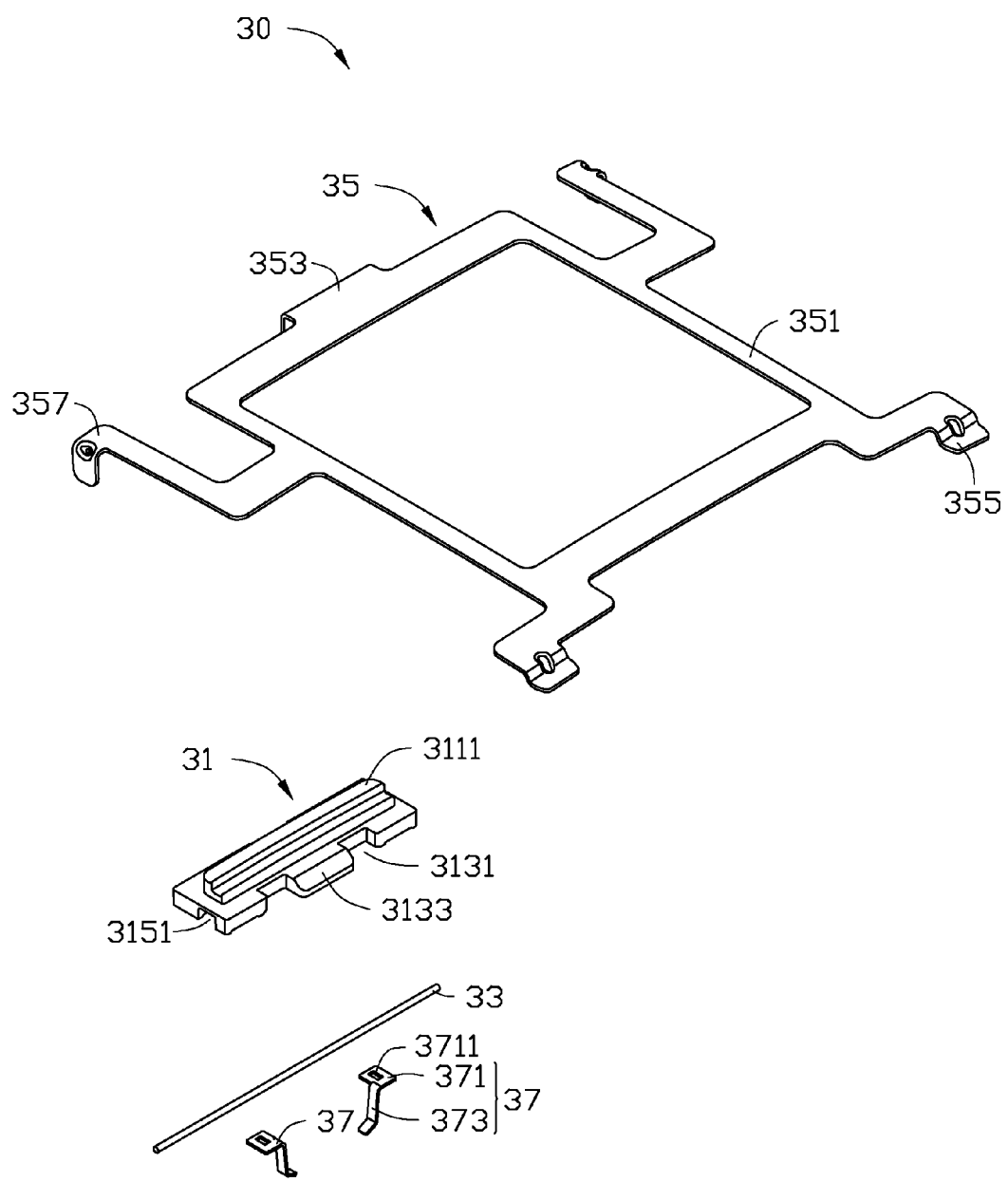
Figure 6:
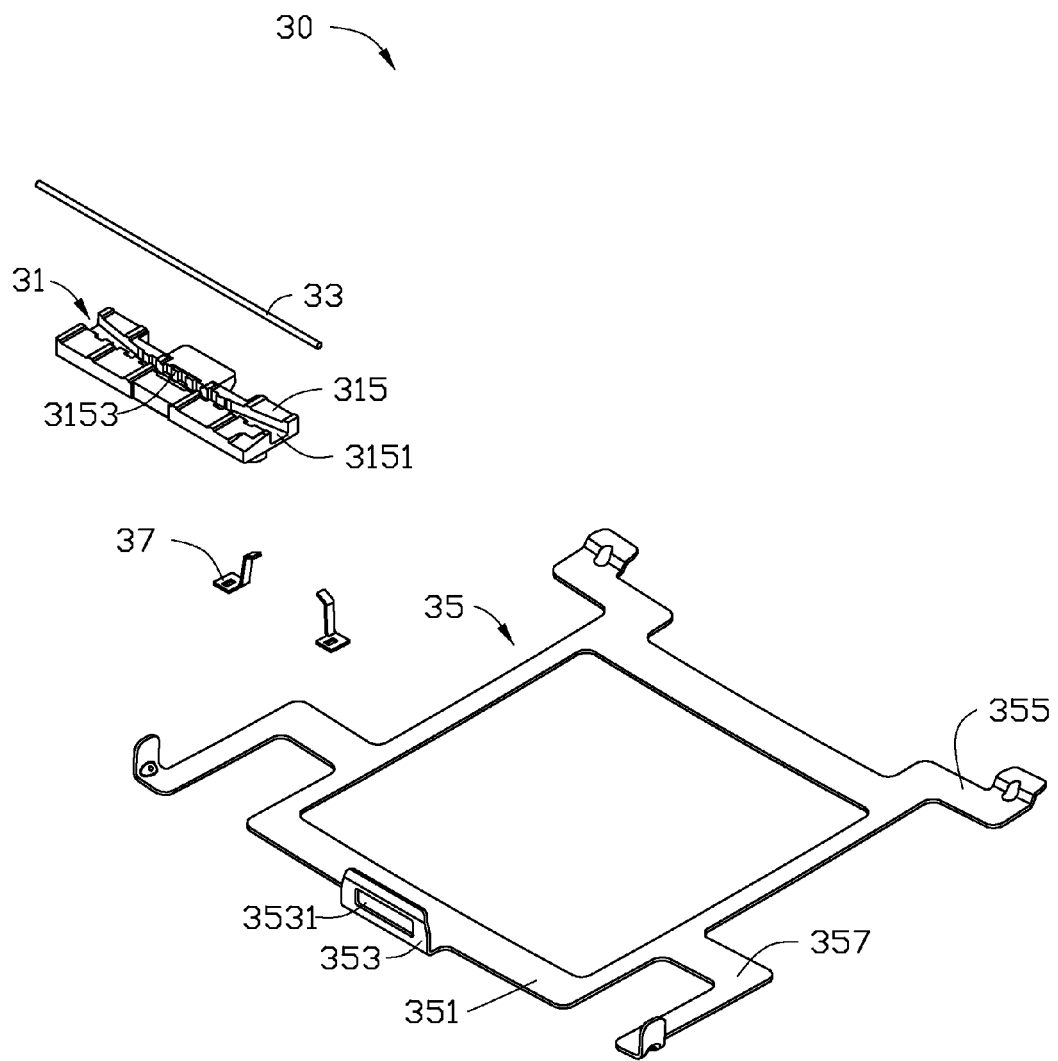
Figure 7:
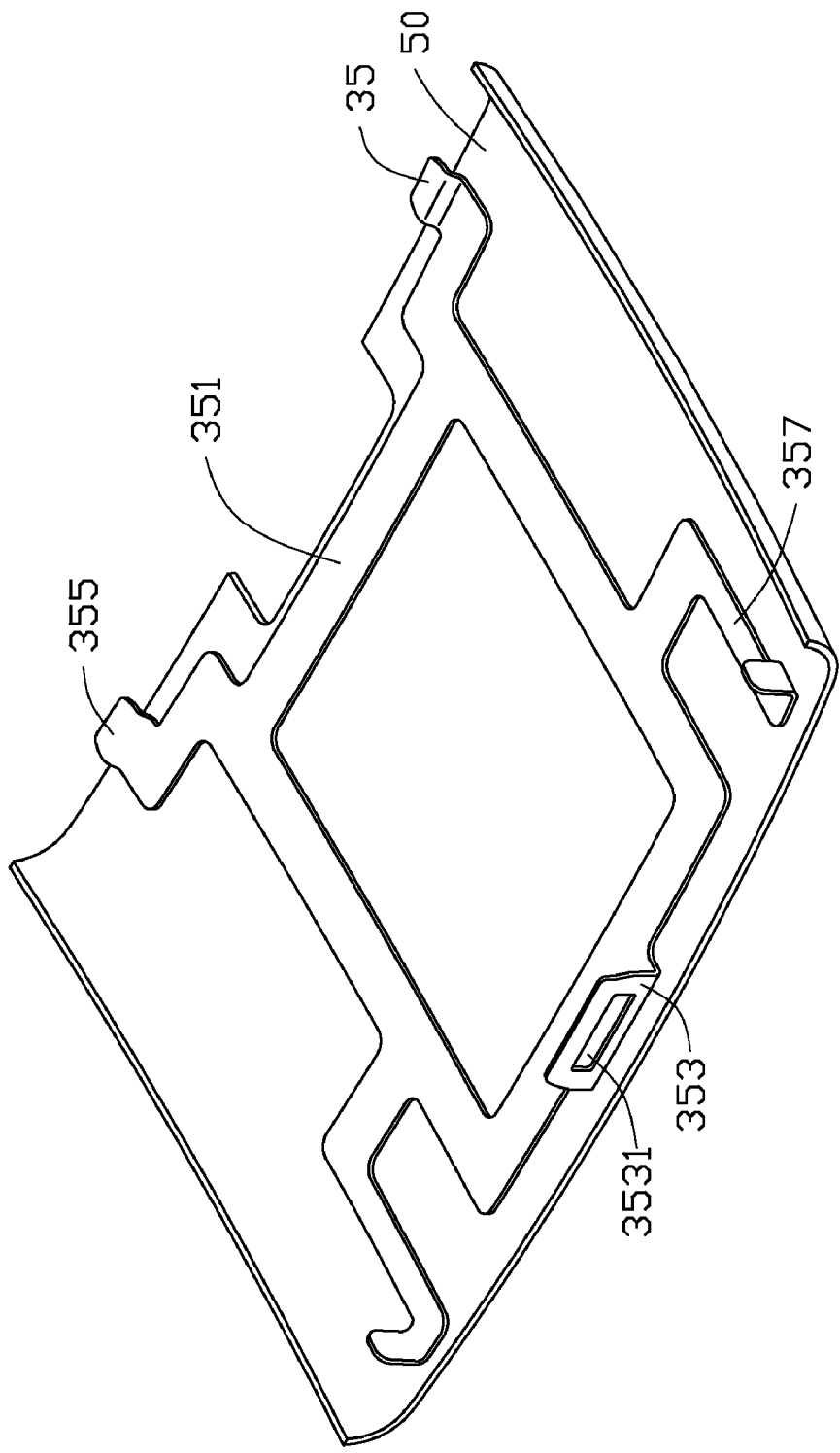
Figure 8:
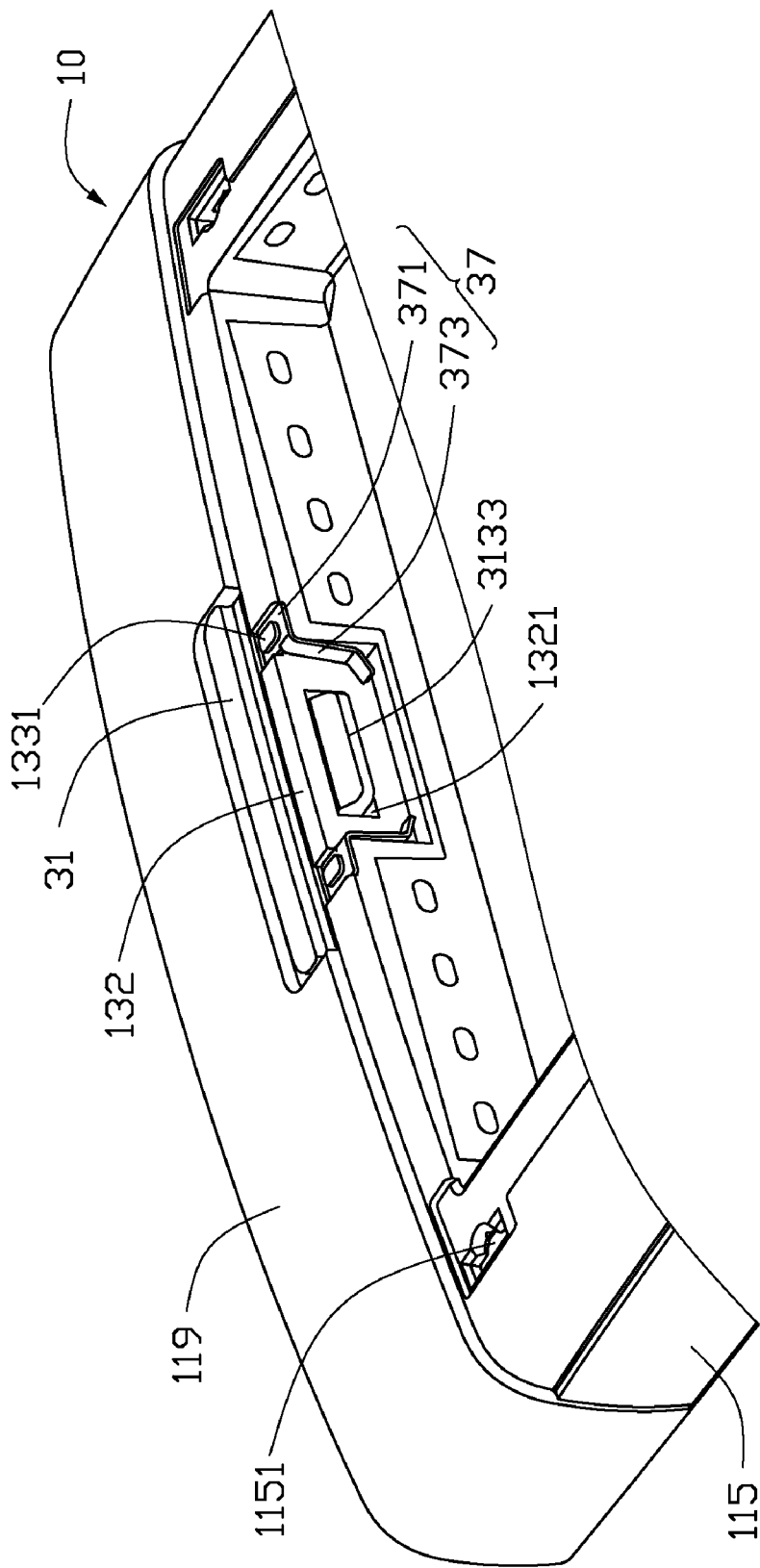
Figure 9:
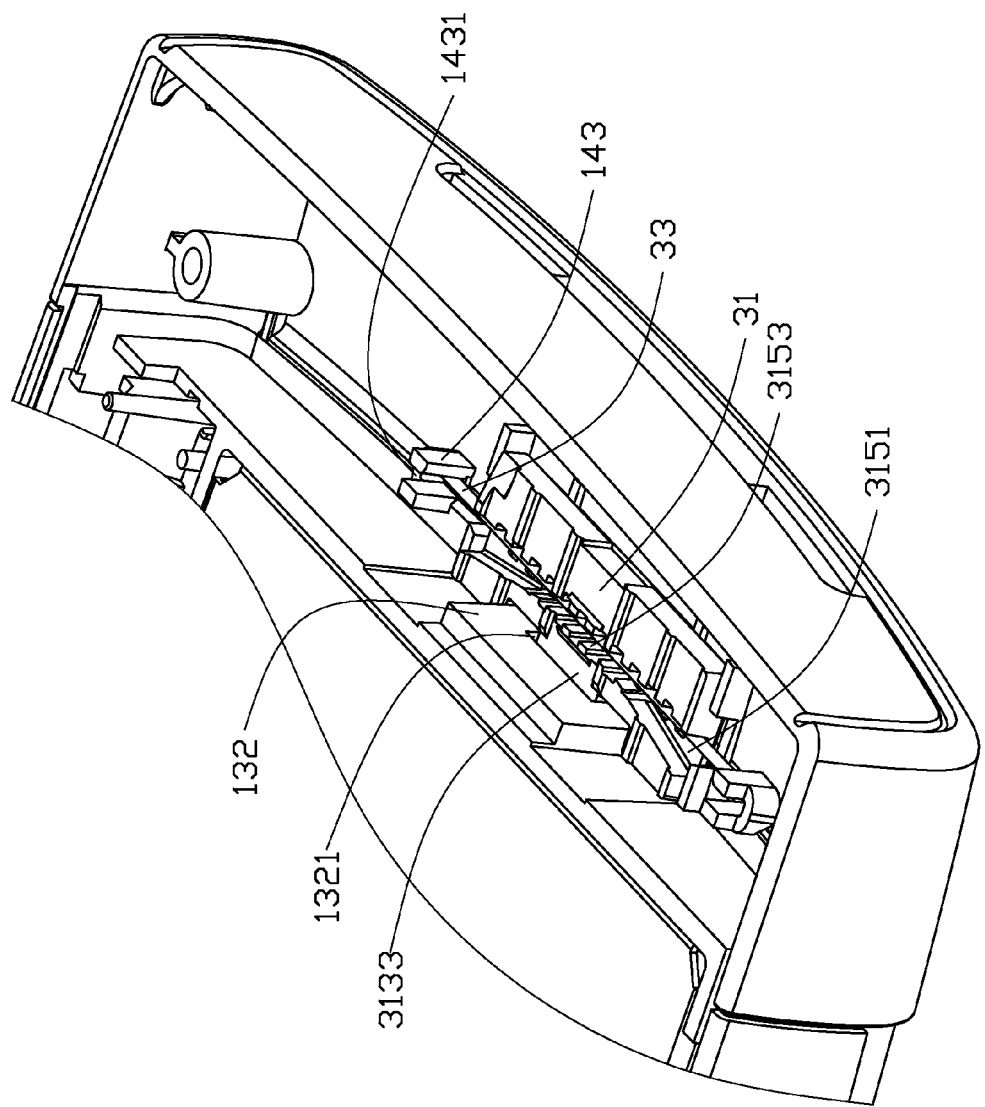

PORTABLE ELECTRONIC DEVICE WITH BATTERY COVER

CROSS-REFERENCE TO RELATED APPLICATIONS

This application is related to a U.S. patent application Ser. No. 12/753,121 entitled "PORTABLE ELECTRONIC DEVICE WITH BATTERY COVER", by SHI-XU LIANG. Such application has the same assignee as the present application and has been concurrently filed herewith. The above-identified application is incorporated herein by reference.

BACKGROUND

1. Technical Field

The exemplary disclosure generally relates to electronic devices, and particularly to a portable electronic device with a latching battery cover.

2. Description of Related Art

Batteries are widely used in portable electronic devices, such as personal digital assistants (PDAs), mobile phones, and so on. Often, batteries are attachably received in the electronic device, and battery covers provided to connect with housings of the electronic devices to secure the batteries. Batteries are replaced by opening the battery covers when, for example, the batteries are damaged and/or dead and/or no longer rechargeable.

Although battery cover assemblies may be simple, the engagement between the battery cover and the housing of the mobile phone can be too strong to allow easily detachment thereof.

Therefore, there is room for improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the portable electronic device with a latching battery cover. Moreover, in the drawings, like reference numerals designate corresponding parts throughout the several views, in which:

FIG. 1 is an exploded, isometric view of an exemplary embodiment of a portable electronic device;

FIG. 2 is similar to FIG. 1, but viewed from another aspect;

FIG. 3 is an enlarged view showing one portion of a base of the portable electronic device in FIG. 1;

FIG. 4 is similar to FIG. 3, but viewed from another aspect;

FIG. 5 is an enlarged view of the latching module in FIG. 1;

FIG. 6 is similar to FIG. 5, but viewed from another aspect;

FIG. 7 is an isometric view showing the latching element to be attached to the battery cover ;

FIG. 8 is an isometric view showing the operating element and the resisting elements attached to the base;

FIG. 9 is similar to FIG. 8, but viewed from another aspect;

FIG. 10 is an isometric view showing the portable electronic device in a closed state; and FIG. 11 is similar to FIG. 10, but showing the portable electronic device in an open state.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIGS. 1 and 2 show an exemplary embodiment of a portable electronic device 100. The portable electronic device 100 includes a base 10, a latching module 30, and a removable cover 50. The base 10 has a first surface 11 and a second surface 12 opposite to the first surface 11. The base 10 defines a chamber 111 in the first surface 11 to receive a battery (not shown). The chamber 111 is surrounded by sidewalls 115, a first end wall 117, and a second end wall 119 opposite to the first end wall 117. The cover 50 covers the chamber 111 to secure the battery in the chamber 111 and the cover 50 is retained in position by the latching module 30. Each of the two sidewalls 115 defines an opening 1151 adjacent to the second end wall 119. The first end wall 117 defines two spaced-apart apertures 1171.

Referring to FIG. 3, the base 10 defines a through hole 131 and forms a supporting wall 132 that defines an end of the chamber 111. The supporting wall 132 defines a receiving hole 1321. The receiving hole 1321 allows the through hole 131 to communicate with the chamber 111. The supporting wall 132 defines two grooves 133 and forms two posts 1331, one post 1331 is received in each corresponding groove 133. The base 10 defines a space 134 communicating with the through hole 131 as shown in FIG. 4. Two positioning portions 14 extend upwards from a bottom surface of the space 134. Each positioning portion 14 has a rib 141 adjacent to the through hole 131, and two blocks 143. Each rib 141 defines a cutout 1411. A slot 1431 is defined between the blocks 143.

The latching module 30 includes an operating element 31, an elastic element 33, a latching element 35, and two resisting elements 37. The operating element 31 has a pressing protrusion 3111 formed on one surface for pressing, e.g., by a finger, and a curved groove 3151 defined in the opposite surface. Two sidewalls of the curved groove 3151 have a plurality of spaced projections 3153 (shown in FIG. 6) for positioning the elastic element 33. The operating element 31 defines two spaced notches 3131 in a sidewall, and a latching protrusion 3133 formed between the two notches 3131. A width of the latching protrusion 3133 is approximately the same as that of the receiving hole 1321.

Referring to FIG. 6, the elastic element 33 is received in the curved groove 3151. Each end of the elastic element 33 is received in one of the corresponding slots 1431. The latching element 35 includes a frame 351. A flange 353 extends from and perpendicular to one end of the frame 351, and two spaced-apart first latching arms 355 extend from the other end of the frame 351. Each first latching arm 355 is received in one of the corresponding apertures 1171. The flange 353 defines a latching hole 3531 that receive the latching protrusion 3133 of the latching element 31. Two sides of the frame 351 each extend a second latching arm 357 to be received in the corresponding opening 1151.

Referring back to FIG. 5, each resisting element 37 includes a tab 371 and a resilient sheet 373 extending from the tab 371. Each tab 371 defines a positioning hole 3711 through which a corresponding post 1331 passes.

During assembly of the portable electronic device 100, the latching element 35 is fixed to the cover 50, as shown in FIG. 7. In the exemplary embodiment, the latching element 35 is fixed to the cover 50 by laser melting. The resisting elements 37 are each attached to the base 10 such that each post 1331 is received in its corresponding positioning hole 3711, as shown in FIG. 8. The operating element 31 is received in the through hole 131. Elastic element 33 is received in the curved groove 3151 and the ends of the elastic element 33 are received in the slot 1431 such that the latching protrusion 3133 is slidably received in the receiving hole 1321 and extends into the chamber 111 as shown in FIG. 9.

Figure 10:
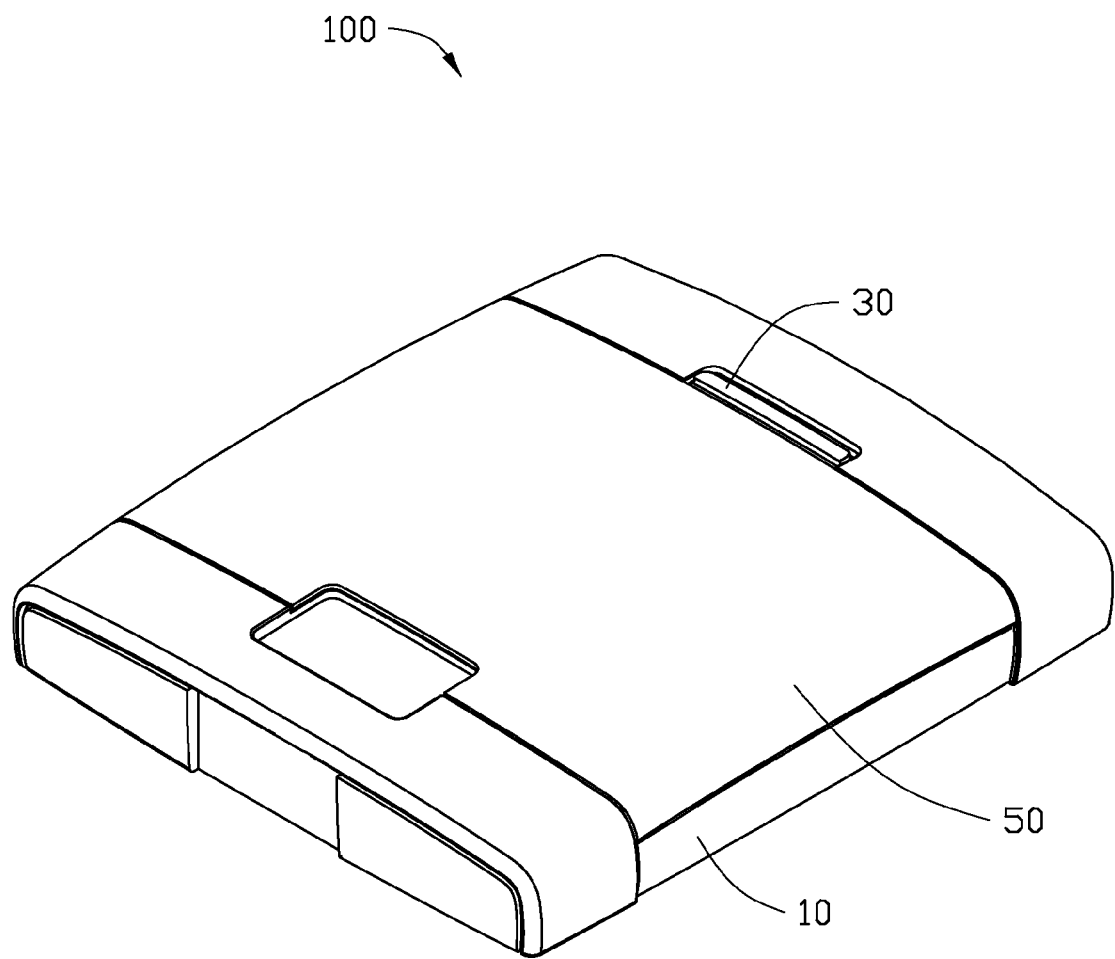

The first latching arms 355 are received in the corresponding apertures 1171, and bias the cover 50, such that the flange 353 of the latching element 35 abuts the latching protrusion 3133 to bias the operating element 35 away from the chamber 111, and the operating element 35 resists and deforms the elastic element 33. When the cover 30 attaches to the base 10, the latching protrusion 3133 is received in the latching hole 3531 by the elastic force of the elastic element 33, and the second latching arms 357 each are received in their corresponding openings 1151. The resilient sheet 373 of the resisting elements 37 resists the flange 353, such that the portable electronic device 100 is assembled, as shown in FIG. 10.

Figure 11:
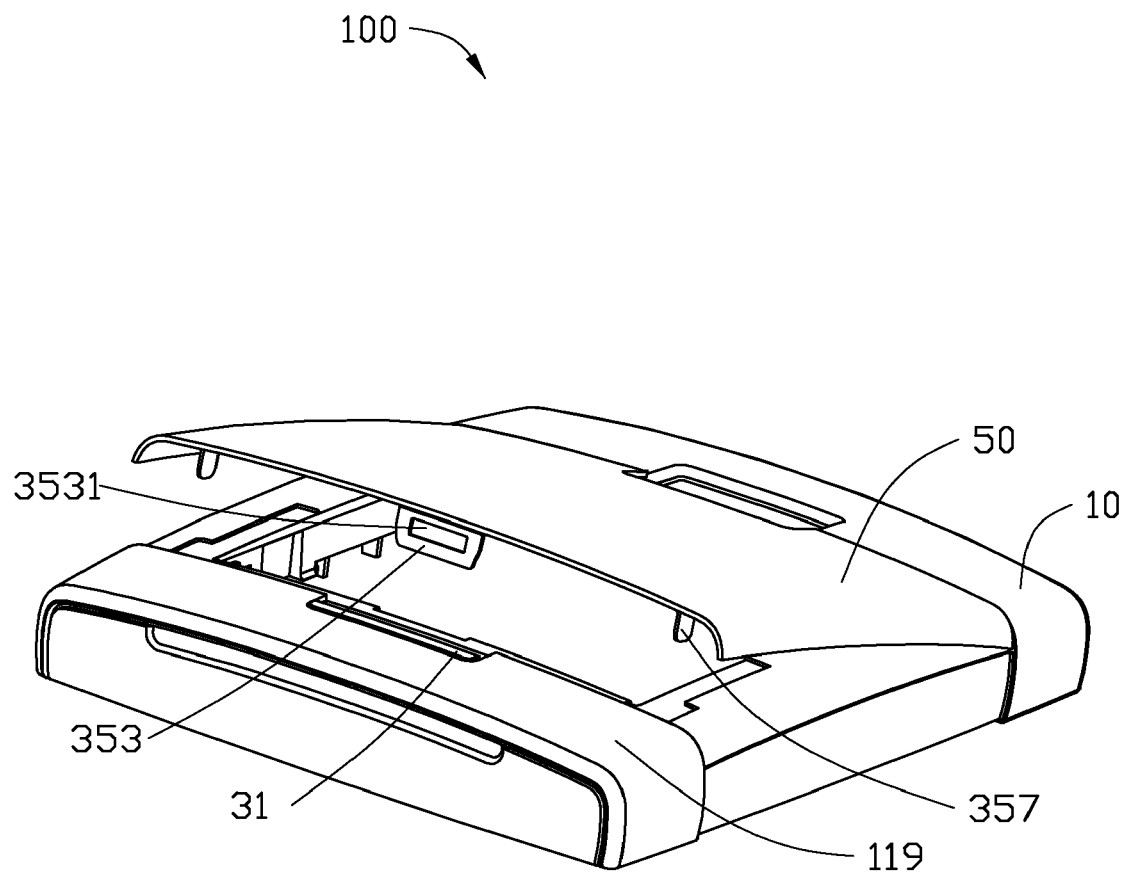

Referring to FIG. 11, when the cover 50 is to be removed, e.g., when the battery is to be changed, the protrusion 3111 is pressed to move the operating element 31 away from the cover 50. The operating element 31 abuts and deforms the elastic element 33, and latching protrusion 3133 separates from the latching hole 3531. The elastic force of the resilient sheets 373 of the resisting element 37 biases the cover 50 away from the base 10, and the operating element 31 returns to its normal state by the elastic force of the elastic element 33.

It is notable that the number of resisting elements 37 is not limited to two, and elastic element 33 can be attached to the operating element 31 using a through hole or formed integrally by insert-molding. Furthermore, the distal end of the cover 50 from the operating element 31 can be rotatably attached to the base 10 by a hinge or pin.

Resisting element 37 of the portable electronic device 100 resists the latching element 35 to separate the cover 50, for fast and easy removal thereof.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A portable electronic device comprising:
a base defining a chamber to receive a battery;
a cover covering the chamber and detachably attached to the base;
a latching module comprising an operating element slidably attached to the base, a latching element attached to the cover, a resisting element configured for causing the latching element to move the cover to separate from the base when detaching, wherein the resisting element comprises a tab attached to the base and a resilient sheet extending from the tab.

2. The portable electronic device as claimed in claim 1, wherein the tab defines a positioning hole for attaching to the base, and the resilient sheet elastically resists the latching element.

3. The portable electronic device as claimed in claim 1, wherein the base defines a through hole and forms a supporting wall defining a receiving hole, the through hole communicates with the chamber by the receiving hole, the operating element forms a latching protrusion, and the latching element has a flange defining a latching hole, the latching protrusion passes through the receiving hole and is received in the latching hole.

4. The portable electronic device as claimed in claim 1, further comprising an elastic element, wherein the elastic element attaches to the operating element and is fixed in the base, the elastic element biases the operating element toward selectively latching with the latching element or separating therefrom.

5. The portable electronic device as claimed in claim 4, wherein the operating element defines a curved groove, in which the elastic element is received.

6. The portable electronic device as claimed in claim 5, the base further forming two positioning portions each comprising a rib adjacent to the through hole and a block defining a slot, wherein each rib defines a cutout, the elastic element is received in the slots and the cutouts.

7. The portable electronic device as claimed in claim 1, wherein the latching element forms two first latching arms and two second latching arms, the base defines two openings and two apertures, each of the first latching arms is received a the corresponding aperture, each of the second latching arms is received in a corresponding opening.

8. The portable electronic device as claimed in claim 2, further comprising an elastic element, wherein the elastic element attaches to the operating element and is fixed in the base, the elastic element biases the operating element toward selectively latching with the latching element or separating therefrom.

9. The portable electronic device as claimed in claim 8, wherein the operating element defines a curved groove, in which the elastic element is received.

10. The portable electronic device as claimed in claim 9, wherein the base further includes two positioning portions each having a rib adjacent to the through hole and a block defining a slot, wherein each rib defines a cutout, the elastic element is received in the slots and the cutouts.

11. A portable electronic device comprising:
a base defining a chamber; and
a cover covering the chamber and rotatably attached to the base;
wherein the portable electronic device further comprises an operating element, a latching element attached to the cover, and a resisting element comprising a tab attached to the base and a resilient sheet extending from the tab, the operating element is slidably attached to the base, and the resisting element causes the latching element to force the cover to separate when detaching.

12. The portable electronic device as claimed in claim 11, wherein the tab defines a positioning hole for attaching to the base, and the resilient sheet elastically resists the latching element.

13. The portable electronic device as claimed in claim 11, wherein the base defines a through hole and forms a supporting wall defining a receiving hole, the through hole communicates with the chamber by the receiving hole, the operating element forms a latching protrusion, the latching element comprises a flange defining a latching hole, the latching protrusion penetrates the receiving hole and is received in the latching hole.

14. The portable electronic device as claimed in claim 11, further comprising an elastic element attached to the operating element and fixed in the base, forcing the operating element to selectively latch with the latching element or separate therefrom.

15. The portable electronic device as claimed in claim 14, wherein the operating element defines a curved groove in which the elastic element is received.

16. The portable electronic device as claimed in claim 15, wherein the base further forms two spaced positioning portions, each comprising a rib adjacent to the through hole and a block defining a slot, each rib defining a cutout wherein the elastic element is received in the slots and the cutouts.

17. The portable electronic device as claimed in claim 11, wherein the latching element forms two spaced latching arms, the base defines two openings, and each the latching arm is received in a corresponding aperture.

18. The portable electronic device as claimed in claim 12, further comprising an elastic element attached to the operating element and fixed in the base, forcing the operating element to selectively latch with the latching element or separate therefrom.

19. The portable electronic device as claimed in claim 18, wherein the operating element defines a curved groove in which the elastic element is received.

20. The portable electronic device as claimed in claim 19, wherein the base further includes two spaced positioning portions, each positioning portion has a rib adjacent to the through hole and a block defining a slot, each rib defining a cutout wherein the elastic element is received in the slots and the cutouts.

* * * * *